United States Patent
Kose et al.

(10) Patent No.: US 11,338,618 B2
(45) Date of Patent: May 24, 2022

(54) EGG CRATE SIDEWALL FEATURES FOR SIPES

(71) Applicants: Sadi Kose, Greenville, SC (US); Robert Cecil Lawson, Greenville, SC (US)

(72) Inventors: Sadi Kose, Greenville, SC (US); Robert Cecil Lawson, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 825 days.

(21) Appl. No.: 15/764,310

(22) PCT Filed: Sep. 30, 2016

(86) PCT No.: PCT/US2016/054750
§ 371 (c)(1),
(2) Date: Mar. 28, 2018

(87) PCT Pub. No.: WO2017/059233
PCT Pub. Date: Apr. 6, 2017

(65) Prior Publication Data
US 2019/0054774 A1   Feb. 21, 2019

(30) Foreign Application Priority Data
Sep. 30, 2015  (WO) ............... PCT/US2015/053343

(51) Int. Cl.
*B29D 30/06* (2006.01)
*B60C 11/12* (2006.01)
*B60C 11/11* (2006.01)

(52) U.S. Cl.
CPC ...... *B60C 11/1218* (2013.01); *B29D 30/0606* (2013.01); *B60C 11/1281* (2013.01);
(Continued)

(58) Field of Classification Search
CPC ............ B60C 11/1218; B60C 11/1281; B29D 2030/0613
See application file for complete search history.

(56) References Cited

U.S. PATENT DOCUMENTS

| | | | |
|---|---|---|---|
| 1,413,190 A | 4/1922 | Rapson | |
| 1,509,259 A | 9/1924 | Rett et al. | |

(Continued)

FOREIGN PATENT DOCUMENTS

| | | |
|---|---|---|
| CN | 1706629 A | 12/2005 |
| CN | 101045285 A | 10/2007 |

(Continued)

OTHER PUBLICATIONS

Machine translation for Japan 2003-182314 (Year: 2021).*
(Continued)

*Primary Examiner* — Steven D Maki
(74) *Attorney, Agent, or Firm* — Hahn Loeser & Parks LLP; Bret A. Hrivnak (57) ABSTRACT

The present invention includes tire treads having a plurality of sipes (14) where at least one of the opposing sides of the sipe thickness includes a plurality of projections (18, 36) and recesses (20, 38) and a method for forming the same.

7 Claims, 4 Drawing Sheets

(52) U.S. Cl.
CPC ....... *B29D 2030/0613* (2013.01); *B60C 11/11* (2013.01); *B60C 2011/1209* (2013.01); *B60C 2011/1277* (2013.01)

(56) References Cited

U.S. PATENT DOCUMENTS

| | | | |
|---|---|---|---|
| 2,121,871 A | 6/1938 | Havens | |
| 2,121,955 A | 6/1938 | Eger | |
| 2,264,767 A | 12/1941 | Ofensend | |
| 2,327,057 A | 8/1943 | Ofensend | |
| 2,637,362 A | 5/1953 | Briscoe et al. | |
| 2,696,863 A | 12/1954 | Ewart et al. | |
| 2,732,589 A | 1/1956 | Steadman | |
| 3,115,919 A | 12/1963 | Roberts | |
| 3,373,790 A | 3/1968 | Newman et al. | |
| 3,608,602 A | 9/1971 | Youngblood | |
| 3,653,422 A | 4/1972 | French | |
| 3,770,040 A | 11/1973 | De Cicco | |
| 3,945,417 A | 3/1976 | Harrelson, Jr. | |
| 3,998,256 A | 12/1976 | Verdier | |
| 4,254,811 A | 3/1981 | Devaux | |
| 4,515,197 A | 5/1985 | Motomura et al. | |
| 4,574,856 A | 3/1986 | Graas | |
| 4,703,787 A | 11/1987 | Ghilardi | |
| 4,723,584 A | 2/1988 | Yamaguchi et al. | |
| 4,794,965 A | 1/1989 | Lagnier | |
| 4,832,099 A | 5/1989 | Matsumoto | |
| 4,994,126 A | 2/1991 | Lagnier | |
| 5,031,680 A | 7/1991 | Kajikawa et al. | |
| 5,248,357 A | 9/1993 | Miyanaga et al. | |
| 5,316,063 A | 5/1994 | Lagnier | |
| 5,342,462 A | 8/1994 | King et al. | |
| 5,445,691 A | 8/1995 | Nakayama et al. | |
| 5,503,207 A | 4/1996 | Ochiai et al. | |
| 5,535,798 A | 7/1996 | Nakamura | |
| 5,769,977 A | 6/1998 | Masaoka | |
| 5,783,002 A * | 7/1998 | Lagnier | B60C 11/12 152/209.1 |
| 5,804,000 A | 9/1998 | Shirai et al. | |
| 6,012,499 A | 1/2000 | Masaoka | |
| 6,102,092 A | 8/2000 | Radulescu | |
| 6,116,310 A | 9/2000 | Shinohara | |
| 6,123,130 A | 9/2000 | Himuro et al. | |
| 6,143,223 A | 11/2000 | Merino Lopez | |
| 6,196,288 B1 | 3/2001 | Radulescu et al. | |
| 6,264,453 B1 | 7/2001 | Jacobs et al. | |
| 6,315,018 B1 | 11/2001 | Watanabe | |
| 6,382,283 B1 | 5/2002 | Caretta | |
| 6,408,910 B1 | 6/2002 | Lagnier et al. | |
| 6,412,531 B1 | 7/2002 | Janajreh | |
| 6,439,284 B1 | 8/2002 | Fontaine | |
| 6,443,200 B1 | 9/2002 | Lopez | |
| 6,461,135 B1 | 10/2002 | Lagnier et al. | |
| 6,467,517 B1 | 10/2002 | Radulescu | |
| 6,668,885 B2 | 12/2003 | Ishiyama | |
| 6,668,886 B1 | 12/2003 | Iwamura | |
| 6,761,197 B2 | 7/2004 | Carra et al. | |
| 6,776,204 B2 | 8/2004 | Cesarini et al. | |
| 6,799,616 B2 | 10/2004 | Himuro | |
| 7,017,634 B2 | 3/2006 | Radulescu et al. | |
| 7,143,799 B2 | 12/2006 | Collette et al. | |
| 7,249,620 B2 | 7/2007 | Croissant et al. | |
| 7,338,269 B2 | 3/2008 | Delbet et al. | |
| 7,507,078 B2 | 3/2009 | Nguyen et al. | |
| 7,793,692 B2 | 9/2010 | Nguyen et al. | |
| 8,267,679 B2 | 9/2012 | Cuny et al. | |
| 8,276,629 B2 | 10/2012 | Bonhomme | |
| 8,393,365 B2 | 3/2013 | Janesh et al. | |
| 9,022,083 B2 | 5/2015 | Voss et al. | |
| 9,387,728 B2 | 7/2016 | Warfford et al. | |
| 9,434,214 B2 | 9/2016 | Iwamura | |
| 9,981,507 B2 | 5/2018 | Warfford et al. | |
| 2002/0017349 A1 | 2/2002 | Lopez | |
| 2002/0033214 A1 | 3/2002 | Carra et al. | |
| 2002/0142056 A1 | 10/2002 | Aperce et al. | |
| 2002/0144762 A1 | 10/2002 | Peda et al. | |
| 2003/0029537 A1 | 2/2003 | Iwamura | |
| 2005/0081972 A1 | 4/2005 | Lopez | |
| 2005/0121124 A1 | 6/2005 | Tsubono | |
| 2005/0183807 A1 | 8/2005 | Hildebrand | |
| 2006/0027295 A1 | 2/2006 | Knispel et al. | |
| 2006/0088618 A1 | 4/2006 | Radulescu et al. | |
| 2007/0084534 A1 | 4/2007 | Byrne | |
| 2007/0095447 A1 | 5/2007 | Nguyen et al. | |
| 2007/0199634 A1 | 8/2007 | Sakamaki | |
| 2007/0295434 A1 | 12/2007 | Nguyen et al. | |
| 2008/0029193 A1 | 2/2008 | Perrin et al. | |
| 2008/0128062 A1 | 6/2008 | Lopez | |
| 2008/0152745 A1 | 6/2008 | Nguyen et al. | |
| 2008/0163970 A1 | 7/2008 | Ohara | |
| 2009/0065115 A1 | 3/2009 | Mathews | |
| 2009/0159167 A1 | 6/2009 | Scheuren | |
| 2009/0218020 A1 | 9/2009 | Sumi | |
| 2009/0301622 A1 | 12/2009 | Brown | |
| 2010/0243119 A1 | 9/2010 | Miyazaki | |
| 2010/0300626 A1 | 12/2010 | Nguyen et al. | |
| 2011/0017374 A1 | 1/2011 | Bervas et al. | |
| 2011/0100519 A1 | 5/2011 | Yamakawa | |
| 2011/0120610 A1 | 5/2011 | Fugier et al. | |
| 2011/0168311 A1 * | 7/2011 | Voss | B60C 11/1218 152/209.18 |
| 2011/0265926 A1 | 11/2011 | De Staercke | |
| 2011/0277898 A1 | 11/2011 | Barraud et al. | |
| 2012/0048439 A1 | 3/2012 | Christenbury | |
| 2013/0014873 A1 | 1/2013 | Voss et al. | |
| 2013/0164401 A1 | 6/2013 | Dusseaux | |
| 2014/0060717 A1 | 3/2014 | Morgan et al. | |
| 2014/0166173 A1 | 6/2014 | Dayet et al. | |
| 2014/0261936 A1 * | 9/2014 | Iwamura | B60C 11/1218 152/209.18 |
| 2015/0053320 A1 | 2/2015 | Mathonet et al. | |
| 2015/0059943 A1 | 3/2015 | Radulescu et al. | |
| 2015/0251499 A1 * | 9/2015 | Jin | B60C 11/1218 152/209.21 |
| 2016/0325590 A1 | 11/2016 | Moser et al. | |
| 2017/0021675 A1 | 1/2017 | Kose et al. | |
| 2017/0225517 A1 | 8/2017 | Lawson et al. | |
| 2017/0246820 A1 | 8/2017 | Lawson | |
| 2018/0272637 A1 | 9/2018 | Lawson et al. | |
| 2018/0281328 A1 | 10/2018 | Collett et al. | |

FOREIGN PATENT DOCUMENTS

| | | |
|---|---|---|
| CN | 101148020 A | 3/2008 |
| CN | 104044406 A | 9/2014 |
| DE | 2024279 A1 | 3/1971 |
| DE | 19506697 A1 | 8/1996 |
| DE | 102006010050 A1 | 9/2007 |
| DE | 102011053743 A1 * | 3/2013 |
| EP | 540340 A2 | 5/1993 |
| EP | 721853 A1 | 7/1996 |
| EP | 925907 A1 | 6/1999 |
| EP | 1125709 A1 | 8/2001 |
| EP | 1170153 A1 | 1/2002 |
| EP | 1243390 A2 | 9/2002 |
| EP | 1782970 A1 | 5/2007 |
| EP | 1920951 A1 | 5/2008 |
| EP | 1935671 A2 | 6/2008 |
| EP | 1938939 A1 | 7/2008 |
| EP | 2376297 B1 | 10/2012 |
| EP | 2570273 A1 | 3/2013 |
| FR | 2730951 A1 | 8/1996 |
| FR | 2909588 A1 | 6/2008 |
| FR | 2950565 A1 | 4/2011 |
| FR | 2971732 A1 | 8/2012 |
| GB | 474588 A | 11/1937 |
| GB | 2061837 A | 5/1981 |
| JP | 62268707 A | 11/1987 |
| JP | 02060805 A | 3/1990 |
| JP | 02303908 A | 12/1990 |
| JP | 2310108 A | 12/1990 |
| JP | 03090317 A | 4/1991 |
| JP | 03112705 A | 5/1991 |
| JP | 03189112 A | 8/1991 |

(56) References Cited

FOREIGN PATENT DOCUMENTS

| | | | |
|---|---|---|---|
| JP | 03279006 A | 10/1991 | |
| JP | 05169913 A | 7/1993 | |
| JP | 5338412 A | 12/1993 | |
| JP | 2000102925 A | 4/2000 | |
| JP | 2001063323 A | 3/2001 | |
| JP | 2001130227 A | 5/2001 | |
| JP | 2002501458 A | 1/2002 | |
| JP | 2003-182314 A | * | 7/2003 |
| JP | 2003182314 A | 7/2003 | |
| JP | 2003211922 A | 7/2003 | |
| JP | 2004009886 A | 1/2004 | |
| JP | 2005104194 A | 4/2005 | |
| JP | 2005170308 A | 6/2005 | |
| JP | 2005262973 A | 9/2005 | |
| JP | 2006051863 A | 2/2006 | |
| WO | 9948707 A1 | 9/1999 | |
| WO | 0238399 A2 | 5/2002 | |
| WO | 2007028438 A1 | 3/2007 | |
| WO | 2010030276 A1 | 3/2010 | |
| WO | 2010039148 A1 | 4/2010 | |
| WO | 2010072523 A1 | 7/2010 | |
| WO | 2011062595 A1 | 5/2011 | |
| WO | 2012058171 A1 | 5/2012 | |
| WO | 2013011335 A1 | 1/2013 | |
| WO | 2015030101 A1 | 3/2015 | |
| WO | 2015080771 A1 | 6/2015 | |
| WO | 2015080772 A1 | 6/2015 | |
| WO | 2015080799 A1 | 6/2015 | |
| WO | 2016053307 A1 | 4/2016 | |
| WO | 2016088622 A1 | 6/2016 | |
| WO | 2017059233 A1 | 4/2017 | |

OTHER PUBLICATIONS

Machine translation for German 102011053743 (Year: 2021).*
Graphs of surfaces z=f(x,y), contour curves, continuity and limits, www.math.wisc.edu, Apr. 2, 2014, two pages (Year: 2014).*
Graphs of surfaces z=f(x,y), contour curves, continuity and limits, www.math.wisc.edu, Mar. 9, 2021, two pages (Year: 2021).*
International Search Report with Written Opinion for application PCT/US2016/054750 dated Dec. 15, 2016.
International Search Report with Written Opinion for application PCT/US2015/053343 dated Jul. 1, 2016.

* cited by examiner

EGG CRATE SIDEWALL FEATURES FOR SIPES

CROSS-REFERENCE TO RELATED APPLICATIONS

This application claims priority to International Application No. PCT/US2015/053343, filed Sep. 30, 2015 with the U.S. Patent Office (acting as a Receiving Office), and which is hereby incorporated by reference.

BACKGROUND OF THE INVENTION

Field of the Invention

This invention relates to tire treads, and more specifically, to the arrangement and formation of sipes within a tire tread.

Description of the Related Art

Sipes are commonly employed in tire treads. Sipes form very narrow grooves or slits within a thickness of the tire tread and are configured to close or remain closed at some instance within a footprint during tire operation. A footprint refers to the area of contact between a tire and a ground surface. In certain instances, to generate an interlocking effect between opposing tread surfaces between which the sipe is arranged (that is, between opposing sides of the tread forming the sipe), the opposing sides or surfaces undulate in both a depthwise direction and a lengthwise direction of the sipe. This interlocking can improve tread wear, but may degrade rolling resistance. Therefore, there is a need to both improve tread wear and reduce rolling resistance.

SUMMARY OF THE INVENTION

Particular embodiments of the present invention include tire treads having a plurality of sipes where at least one of the opposing sides of the sipe thickness includes a plurality of projections and a method for forming the same.

Particular embodiments of a tire tread having a plurality of sipes includes a tire tread comprising a length extending in a lengthwise direction, the lengthwise direction being a circumferential direction when the tread is arranged on a tire, a width extending in a lateral direction, the lateral direction being perpendicular to the lengthwise direction, and a thickness extending in a depthwise direction from an outer, ground-engaging side of the tread, the depthwise direction being perpendicular to both the lengthwise direction and the widthwise direction of the tread. The plurality of sipes each have a length extending at least partially in a direction of the tread length or width, a height extending at least partially in a direction of the tread depth and perpendicular to the tread length, and a thickness. Each sipe is arranged between opposing surfaces of the tread within the tread thickness. Further, at least one of opposing sides of the sipe thickness includes a plurality of projections, the plurality of projections being spaced apart. In certain instances, each projection has a height measuring 0.025 to 0.375 millimeters.

In particular embodiments a method for forming the tire tread having a plurality of sipes includes a step of molding each of a plurality of sipes using a sipe-molding member. Each sipe-molding member has a length configured within the tread to extend at least partially in a direction of the tread length or width, a height configured within the tread to extend at least partially in a direction of the tread depth and perpendicular to the tread length, and a thickness. Each sipe-molding member is arranged between opposing surfaces of the tread within the tread thickness. At least one of opposing sides of the sipe-molding member thickness includes a plurality of projections being spaced apart. In certain instances, each projection has a height measuring 0.025 to 0.375 millimeters. The method for forming the tire tread having a plurality of sipes further includes removing the sipe-molding member and leaving a sipe remaining within the tread. The sipe has a void shaped as the sipe-molding member and a plurality of projections corresponding to the plurality of projections arranged along the sipe-molding member.

The foregoing and other embodiments, objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

The present invention includes tire treads, tires including such treads, and methods for forming tire treads, where any such tread includes a sipe having the surface geometry described herein.

With regard to the tire treads described herein, it is appreciated that each such tread includes a length, width, and thickness. The length extends in a lengthwise direction. As the tread may be formed with the tire, or separately for later installation on the tire, such as during retreading operations, for example, the lengthwise direction of the tread is a circumferential (that is, annular) direction when the tread is arranged on a tire. The width extends in a lateral direction, the lateral direction being perpendicular to the lengthwise direction, while the thickness extends in a depthwise direction from an outer, ground-engaging side of the tread, the depthwise direction being perpendicular to both the lengthwise direction and the widthwise direction of the tread.

The purpose of this invention is to introduce a surface geometry to supplement any undulation or undulating of the sipe thickness, for the purpose of increasing the surface friction between, and improved interlocking between, opposing sides of the tread between which the sipe is arranged. In turn, improvements in wear, dry braking and rolling resistance may be achieved. Additionally, because the new surface geometry increases the rigidity of the sipe-forming mold member, a wider sipe-forming area along said mold member may be increased and/or the thickness of the sipe-forming area may be reduced, each of which can lead to further improvements in wear, dry braking and rolling resistance.

Figure 1:
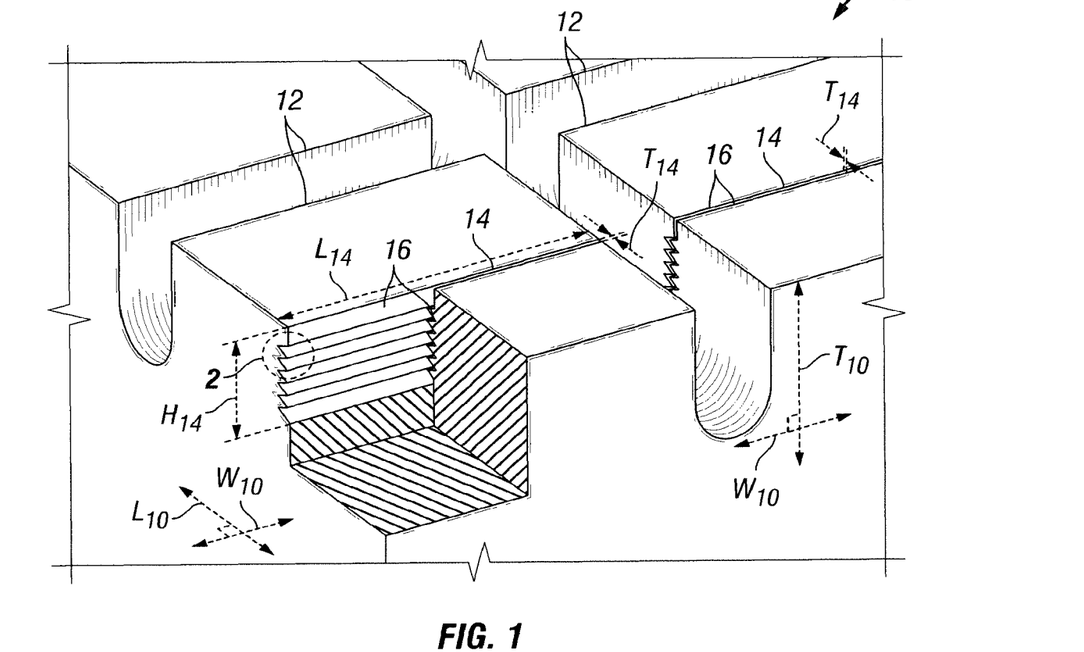
FIG. 1 is a partial perspective view of a tire tread showing a plurality of tread blocks including a sipe, where one tread block is shown in a partial cutaway to better show the details of a sipe, in accordance with an embodiment of the invention.

It is appreciated that the surface geometry described herein may be applied to any sipe known to one of ordinary skill in the art, or obvious variation thereof. For example, with reference to an exemplary embodiment shown in FIG. 1, a partial perspective view of a tire tread 10 is shown having a plurality of tread blocks 12 each including a sipe 14. One sipe 14 is shown in greater particularity in a partial cutaway of a particular tread block 12, which is then shown in an enlarged view in FIG. 2. As shown, tread 10 includes a plurality of sipes 14 each having a length $L_{14}$ extending at least partially in a direction of the tread length $L_{10}$ or width $W_{10}$, a height $H_{14}$ extending at least partially in a direction of the tread depth $T_{10}$ and perpendicular to the tread length, and a thickness $T_{14}$. As best seen in FIG. 1, each sipe 14 is arranged between opposing sides or surfaces 16 of the tread within the tread thickness.

Figure 2:
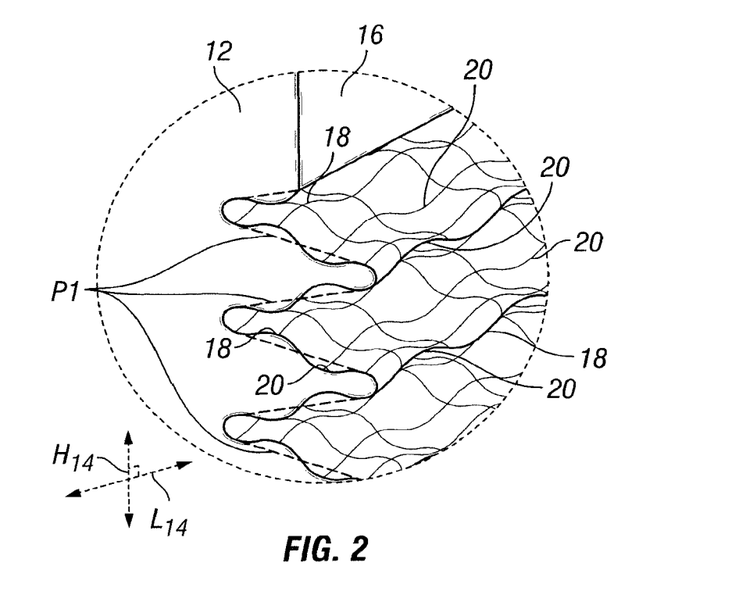
FIG. 2 is an enlarged view of Section 2 from FIG. 1.

It is appreciated that the sipe may form a planar or contoured sipe. In other words, the body of the sipe may be planar or contoured. A planar sipe may also be referred to as a straight sipe. A contoured sipe is non-planar, where the thickness extends in a direction of the sipe length and/or height along any desired non-linear path, which may be a curvilinear path or an undulating path, for example. In an exemplary embodiment, as can be seen in FIGS. 1-2, the sipe thickness $T_{14}$ (forming a body of the sipe) undulates back and forth along a first path P1 in a direction of the tread length $L_{10}$ as the sipe extends in a direction of the sipe height $H_{14}$, which is also the direction of the tread depth $T_{10}$ in the embodiment shown. In other variations, the first path undulates back and forth in a direction of the tread length $L_{10}$ while the first path extends a direction of the sipe length $L_{14}$, which, in the embodiment shown, would be in the direction of the tread width $W_{10}$. Of course, because the sipe 14 may be formed in any arrangement within the tread, the sipe length and width may extend at least partially in any direction of the tread length or width. Because the undulating thickness does not pertain to or operate as any surface geometry, the undulating thickness of the sipe can be referred to as an undulating body. When, as noted above, a sipe more generally is planar or contoured in form, it can be said that the body of the sipe is planar or contoured.

The first path can be described as being a non-linear, undulating path, as the first path forms a plurality of undulations. In the embodiment shown, the undulating path is curvilinear, although in other variations, the undulating path may comprise a series of line segments, such as to form a stepped or zig-zagging undulating path. In certain embodiments, the plurality of undulations have a period greater than the spacing between the plurality of projections (discussed further below) and/or an amplitude of greater than the amplitude of each of the plurality of projections.

As it is appreciated that the surface geometry described herein may be applied to any sipe known to one of ordinary skill in the art, or any obvious variation thereof, in particular variations of the sipes described herein, a sipe (and its thickness or body) may not undulate at all and remain planar or may undulate in one or more directions. For example, a sipe (and its thickness or body) may not only undulate back and forth as the sipe extends in a particular direction, the sipe (and its thickness or body) may also undulate back and forth as the sipe extends in another direction. In extending in the second direction, it can be said that the sipe (and its thickness or body) undulates along a second path (a second non-linear, undulating path) in a second direction. For example, with reference to FIG. 7, a sipe 14 is shown that undulates as the sipe extends in both a direction of the sipe height $H_{14}$ (via non-linear, undulating path P1) and a direction of the sipe length $L_{14}$ (via non-linear, undulating path P2). In this embodiment, the two directions are perpendicular to each other. Still, in other embodiments, the two directions may be biased to each other by an angle other than 90 degrees (perpendicular). It is noted that in FIG. 7, a prior art sipe is shown without the surface geometry discussed herein for the purpose of simplifying the figure. Accordingly, any surface geometry described herein, such as the surface geometry shown in FIGS. 1-6, may be applied to the sipe of FIG. 7.

As to the surface geometry for application to any desired sipe, and therefore for application to one or both of the opposing tread sides or surfaces between which the sipe is arranged and defined, the resulting geometry provides surface geometry features comprising a plurality of projections and/or recesses that form a or non-planar or contoured surface, much like a textured surface, such that opposing sides of the tread between which the sipe is arranged observe increased friction when relative movement between the two sides is attempted during tire operation. In applying the surface geometry to the sipe, the surface geometry is also applied to the plurality of undulations, or, in other words, the sipe body. It is appreciated that spaced apart projections form an interstitial space arranged between the projections, the interstitial space being a recess relative to the projections. Of course, the opposite is true as well, where spaced apart recesses form an interstitial space arranged between the recesses, the interstitial space being a projection relative to the recesses. Therefore, projections and recesses are used with reference to each other, and not as to how each is formed along a surface. Additionally, it is noted that a projection of the sipe is associated with a corresponding recess on one of the opposing sides or surfaces, and vice versa. In certain embodiments, the surface geometry features are formed such that surface geometry features arranged on the opposing sides generally interlock, such as when the opposing sides are mirrored opposites of each other, for example.

With reference to FIGS. 1 and 2, surface geometry features comprising a plurality of projections 18 and corresponding recesses 20 is shown along one of the opposing sides or surfaces 16 of the tread 10 between which the sipe is arranged and defined. The plurality of projections 18 and recesses 20 are spaced along the length $L_{14}$ and height $H_{14}$ of the sipe. In the variation shown, the projections and recesses are uniformly spaced apart, although it is appreciated that in other variations, the projections and/or recesses may be uniformly or non-uniformly spaced apart as desired. While the arrangement of projections 18 and recesses 20 is shown to form a generally smooth or rounded contoured surface, it is contemplated that more defined projections and/or recesses may be provided such that the surface is not smoothly contoured, such as where the projections form cylinders, rectangles, or pointed cones, for example. In particular embodiments, the smoothly or rounded contoured surface shown in FIG. 2 comprising a plurality of uniformly spaced projections 18 and recesses 20 represented by a function of $f(x,y)=A*\sin(B*x)*\sin(C*y)$, at least along portions thereof, where A, B, and C are scaling factors. In particular, B and C control the period or spacing between protrusions and recesses, while A controls projection amplitude and recess depth with B and C. The surface generated by this function, which is also represented in the figures, generates an egg crate-like surface. The smooth or rounded contoured is also described as extending along an undulating path in two perpendicular directions at particular locations. Accordingly, by varying A, B, and C as desired, the surface geometry described herein may be obtained by one of ordinary skill using said formula. In particular embodiments, with particular reference to FIGS. 3 and 4 (showing the embodiment of FIGS. 1 and 2 in closer detail), the plurality of projections 18 are spaced apart from the middle of one projection to the middle of an adjacent projection, or from peak to peak and have a height (also referred to as an amplitude) measuring 0.025 to 0.375 millimeters (mm) or 0.025 to 0.25 mm in other variations. The height or amplitude is measured from the base or bottom of the projection. In certain embodiments, the plurality of projections are spaced apart by a distance that is less than twice the amplitude $A_{P1}$ of the first path P1, when the sipe thickness undulates. Twice the amplitude means the amplitude multiplied by two (2), where the amplitude or height is measured from the base or bottom of the projection. In more particular variations, the projections and recesses are arranged along an undulating path forming a plurality of undulations having a period (which is a spacing from the middle of one projection to the middle of an adjacent projection, or from peak to peak) of 0.1 to 3.0 mm, 0.1 to 2.0 mm, or 0.1 to 1.0 mm, and an amplitude of 0.025 to 0.375 mm or 0.025 to 0.250 mm in other variations. In such embodiments, twice the amplitude measures the distance between opposing peaks along the undulation within a single period. It is appreciated that the undulations may be formed along the surface without impacting the other side of the sipe, or the sipe thickness may undulate along the undulating path, such that where a projection is formed on one side of the sipe, a recess is formed opposite the projection on the other side of the sipe.

Figure 3:
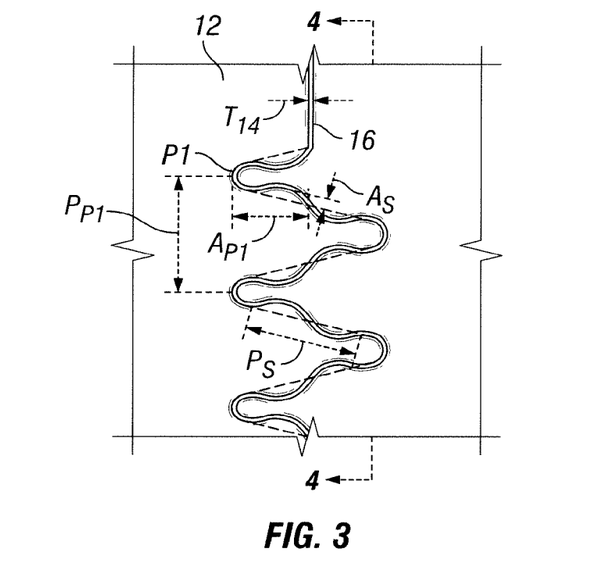
FIG. 3 is a side view of the sipe shown in FIGS. 1 and 2.
Figure 4:
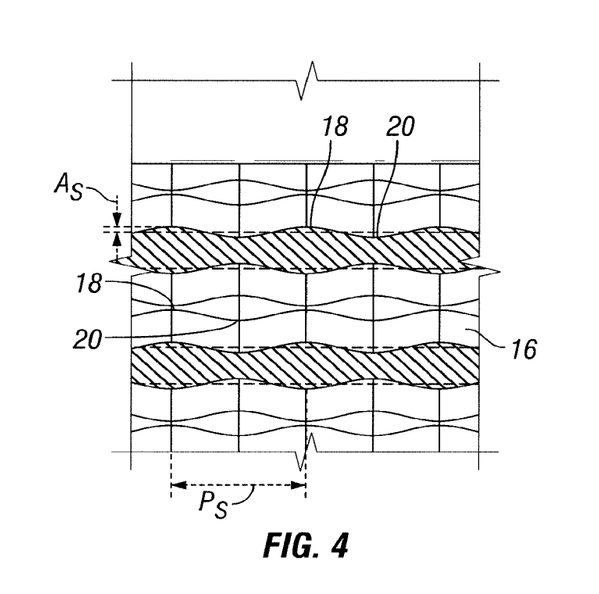
FIG. 4 is a sectional view of the sipe shown in FIG. 3 taken along line 3-3.

With reference to FIGS. 3 and 4, the tread shown in FIGS. 1 and 2 is provided in a side view and partial sectional view, respectively, to better show the undulating surface geometry features, namely, projections 18 and recesses 20. The amplitude $A_S$ and period $P_S$ are shown for the undulating path forming the projections 18 and recesses 20 along the sipe or adjacent tread surface, relative the undulating path P1 along which the sipe thickness or sipe body extends. The amplitude and period of undulating path P1 is represented as $A_{P1}$ and $P_{P1}$, respectively. An arrangement of projections and recesses can also be described as being arranged in an alternating projection-recess arrangement along the length and height of the sipe, such that the opposing sides of the tread are arranged in a mating configuration. Additionally, an arrangement of projections and recesses can be described as being arranged in an alternating arrangement within a plurality of rows, where adjacent rows are shifted relative to each other such that each projection in any row is arranged adjacent to a recess in each adjacent row (columns). This is seen in FIGS. 3 and 4, but can also be observed in FIGS. 2, 4, and 5.

It is appreciated that any sipe described herein may be formed by any known method for forming sipes in treads. For example, a method for forming a tire tread comprises molding any such sipe into a tire tread. In particular embodiments, a method for forming a tire tread comprises a step of molding each of a plurality of sipes using a sipe-molding member. The sipe-molding member includes a portion having the same shape as any particular sipe described herein, where such portion of the sipe-forming member is a solid form of the sipe, which is a void. In particular embodiments, for example, and with reference to FIGS. 5 and 6, a sipe-molding member 30 has a length $L_{30}$ configured within the tread to extend at least partially in a direction of the tread length or width, a height $H_{30}$ configured within the tread to extend at least partially in a direction of the tread depth and perpendicular to the tread length, and a thickness $T_{30}$. Each sipe-molding member is arranged within the tread thickness, between opposing surfaces or sides of the tread within the tread thickness. The sipe-molding member thickness $T_{30}$ undulates back and forth along a first path P1 as the sipe-molding member extends in a direction of the sipe-molding member height $H_{30}$ (or length $L_{30}$). In particular embodiments, the first path P1 forms a plurality of undulations 32 and has a period $P_{pi}$ greater than the spacing (referred to as period $P_S$ in the embodiment shown) between each of the plurality of projections and an amplitude $A_{P1}$ of greater than the amplitude (referred to as amplitude $A_S$ in the embodiment shown) of each of the plurality of projections. At least one of the opposing sides 34 of the sipe-molding member thickness $T_{30}$ along one or more of the plurality undulations 32 includes a plurality of projections 36, for the purpose of forming the plurality of surface geometry projections along the resulting sipe, the plurality of projections being spaced apart by a distance less than the period $P_{P1}$ of the first path P1 and each having a height that is less than twice the amplitude $A_{P1}$ of the first path and measuring 0.025 to 0.375 millimeters. Twice the amplitude means the amplitude multiplied by two (2), where the height is measured from the base or bottom of the projection. Further steps of such methods includes removing the sipe-molding member, which leaves a sipe remaining within the tread, the sipe having a void shaped as the sipe-molding member and a plurality of projections corresponding to the plurality of projections arranged along the sipe-molding member.

Figure 5:
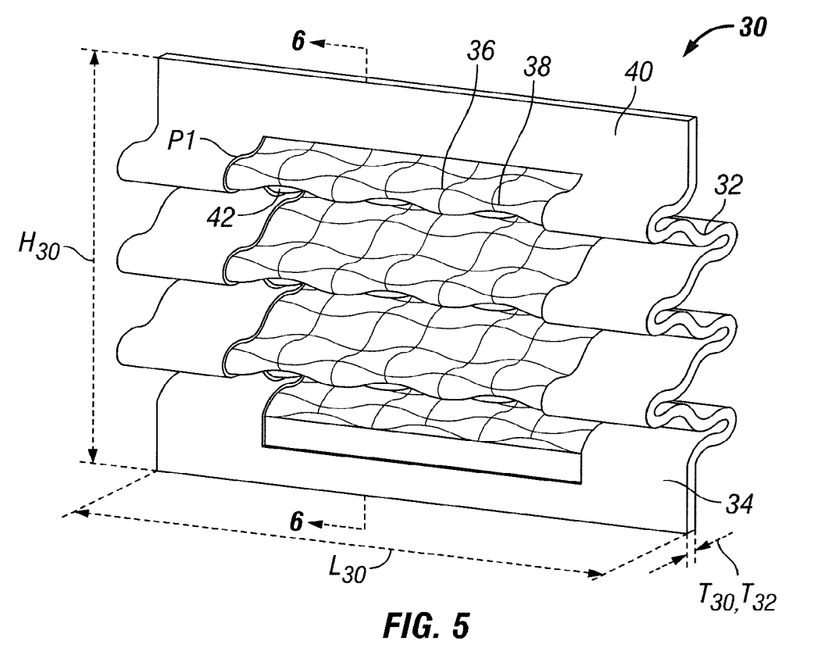
FIG. 5 is a perspective view of a sipe-mold member for forming the sipe in FIG. 1, in accordance with an exemplary embodiment of the invention.
Figure 6:
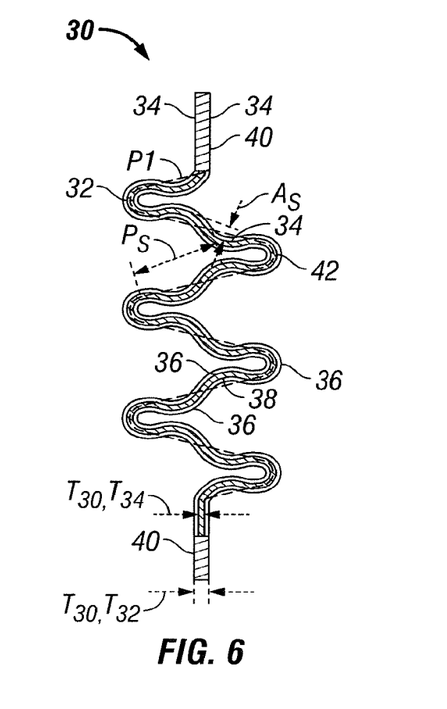
FIG. 6 is a sectional view of the sipe-mold member shown in FIG. 5 taken along line 6-6.
Figure 7:
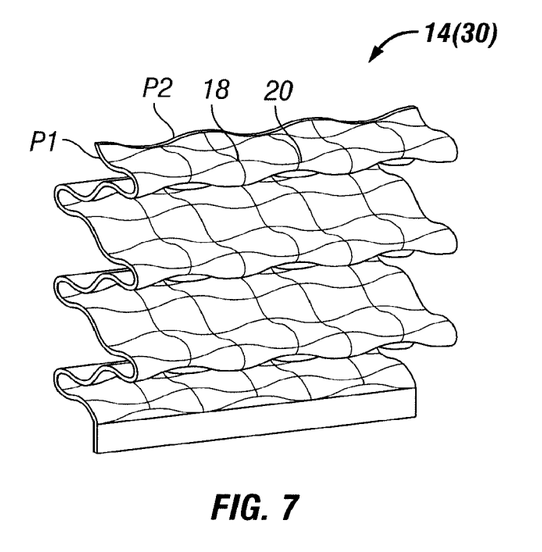
FIG. 7 is a perspective view of a sipe, in accordance with another embodiment of the invention.

It is appreciated that any other feature of the sipes described herein are incorporated into the sipe-molding member to form a sipe of like form. With reference to FIG. 6, for example, in certain embodiments, both of the opposing sides 34 of the sipe-molding member thickness $T_{30}$ along one or more of the plurality undulations 32 include a plurality of projections 36, the plurality of projections being spaced apart by a distance less than the period of the first path and each having a height that is less than twice the amplitude of the first path and measuring 0.025 to 0.375 millimeters. Furthermore, in other embodiments, such as is shown in FIGS. 5 and 6, for example, one or more of the opposing sides 34 of the sipe-molding member thickness $T_{30}$ along one or more of the plurality undulations 32 include a plurality of recesses 38, the plurality of recesses being spaced apart by a distance less than the period of the first path and each having a depth relative an adjacent projection that is less than twice the amplitude of the first path and measuring 0.025 to 0.375 millimeters. In certain variations, the projections and recesses are arranged in an alternating projection-recess arrangement along the length and height of the sipe-molding member, such that the opposing sides of the tread are arranged in a mating configuration. In other variations, the projections and recesses are arranged in an alternating arrangement within a plurality of rows, where adjacent rows are shifted relative to each other such that each projection in any row is arranged adjacent to a recess in each adjacent row. In yet other variations, the projections and recesses are formed by the thickness of the sipe-molding member undulating back and forth along a non-linear, undulating path as the sipe-molding member extends in the direction of the sipe height or length, the non-linear, undulating path forming a plurality of undulations and having a period of 0.1 to 3.0 millimeters and an amplitude of 0.025 to 0.375 millimeters.

It is appreciated that the sipe-molding member may comprise any form desired by one of ordinary skill, for use in any known molding apparatus. For example, in certain instances, such as is shown in one exemplary embodiment in FIGS. 5-6, a sipe-molding member 30 includes a thick sipe-molding portion 40 surrounding at least a portion of a thin sipe-molding portion 42. In this embodiment, both the thick and thin portions include the surface geometry, in addition to the sipe thickness undulating in a direction of the sipe thickness or width. In other variations, only the thin portion includes the surface geometry discussed herein while the thick portion only undulates, or vice versa. It is apparent that the thick sipe-molding portion is thicker than the thin sipe-molding portion. In different variations, the thick-molding portion may partially or fully surround the thin sipe-molding portion, in different variations.

Particular embodiments of this invention were tested to determine an improvement in a friction coefficient by applying a shear to two opposing rubber surfaces being treated with certain variations of the surface geometry described herein and without (smooth). In different tests, the opposing rubber surfaces either had surface geometry characterized as having projections of 0.3 mm amplitudes or 0.05 mm amplitudes or no surface geometry (smooth). All other characteristics of the tread surfaces remained constant. As a result, the samples having sipes characterized as having a surface geometry with projections of 0.3 mm amplitude observed a 60% increase in the measured friction coefficient as compared to surfaces having a surface geometry with projections of 0.05 mm amplitude. Moreover, surfaces characterized as having a surface geometry with projections of 0.3 mm amplitude observed a 70% increase in the measured friction coefficient as compared to surfaces having no surface geometry (smooth surfaces). These results were unexpected.

In other tests, a tread sample comprising five (5) rectangular tread blocks arranged side-by-side in a linear array, the tread blocks being separated by sipes, was tested to determine any improvement in tread stiffness. In each case, different tread samples having different sipe designs were tested in a friction-measurement machine, which applied a shear force in one side-by-side direction of the array, across the tread blocks and under compression such that the tread blocks pushed against one another in the side-by-side direction. In different samples, sipes were characterized as having the surface geometry described herein and shown in the figures, where for different samples the projections had either an amplitude of 0.3 mm or of 0.05 mm with the same, constant spacing. Each of these were compared to samples having sipes without the surface geometry described herein (that is, sipes having a smooth surface). All other characteristics of the tread samples were maintained between the samples as a constant. As a result, the samples having sipes characterized as having a surface geometry with projections of 0.3 mm amplitude observed a 19% increase in rigidity in the side-by-side direction as compared to samples having sipes characterized as having a surface geometry with projections of 0.05 mm amplitude. These results were unexpected.

It is appreciated that any tread discussed herein may be arranged along an annular pneumatic tire, or may be formed separately from a tire as a tire component for later installation on a tire carcass, in accordance with any technique or process known to one of ordinary skill in the art. For example, the treads discussed and referenced herein may be molded with a new, original tire, or may be formed as a retread for later installation upon a used tire carcass during retreading operations. Therefore, when referencing the tire tread, a longitudinal direction of the tire tread is synonymous with a circumferential direction of the tire when the tread is installed on a tire. Likewise, a direction of the tread width is synonymous with an axial direction of the tire or a direction of the tire width when the tread is installed on a tire. Finally, a direction of the tread thickness is synonymous with a radial direction of the tire when the tread is installed on a tire. It is understood that the inventive tread may be employed by any known tire, which may comprise a pneumatic or non-pneumatic tire, for example.

It is appreciated that any of the tread features discussed herein may be formed into a tire tread by any desired method, which may comprise any manual or automated process. For example, the treads may be molded, where any or all discontinuities therein may be molded with the tread or later cut into the tread using any manual or automated process. It is also appreciated that any one or both of the pair of opposing discontinuities may be originally formed along, and in fluid communication with, the outer, ground-engaging side of the tread, or may be submerged below the outer, ground-engaging side of the tread, to later form a tread element after a thickness of the tread has been worn or otherwise removed during the life of the tire.

What is claimed is:

1. A tire tread comprising:
   a length extending in a lengthwise direction, the lengthwise direction being a circumferential direction when the tread is arranged on a tire;
   a width extending in a lateral direction, the lateral direction being perpendicular to the lengthwise direction;
   a thickness extending in a depthwise direction from an outer, ground-engaging side of the tread, the depthwise direction being perpendicular to both the lengthwise direction and the widthwise direction of the tread;
   a plurality of sipes each having a length extending at least partially in a direction of the tread length or width, a height extending at least partially in a direction of the tread depth and perpendicular to the tread length, and a thickness, each sipe arranged between opposing sides of the tread within the tread thickness,
   where at least one of the opposing sides of the tread between which each sipe is arranged includes a plurality of projections, the plurality of projections being spaced apart and each having a height measuring 0.025 to 0.375 millimeters,
   where one or more of the opposing sides of the sipe thickness include a plurality of recesses, the plurality of recesses being spaced apart and each having a depth measuring 0.025 to 0.375 millimeters,
   where the plurality of projections are arranged in an alternating arrangement within a plurality of rows, where adjacent rows are shifted relative each other such that each projection in any row is arranged adjacent to one of the plurality of recesses in each adjacent row, and
   where the projections and recesses are formed along the thickness of the sipe that is also undulating back and forth along a non-linear, undulating path as the sipe extends in the direction of the sipe height or length, the non-linear, undulating path forming a plurality of undulations and having a period of 0.1 to 3.0 millimeters and an amplitude of 0.025 to 0.375 millimeters, where the sipe thickness undulates back and forth along a first path as the sipe extends in a direction of the sipe height or length, the first path forming a plurality of undulations and having a period greater than the spacing between the plurality of projections and an amplitude greater than the amplitude of each of the plurality of projections, where the plurality of projections are arranged along one or more of the plurality undulations, and where the arrangement of projections and recesses is represented by a function of $f(x,y) = A*\sin(B*x)*\sin(C*y)$, where A, B, and C are scaling factors.

2. The tire tread of claim 1, where the other of the opposing sides of the sipe thickness includes a plurality of projections, the plurality of projections being spaced apart and each having a height measuring 0.025 to 0.375 millimeters.

3. The tire tread of claim 1, where for each of the plurality of sipes, the plurality of projections and the plurality of recesses are arranged in an alternating projection-recess arrangement along the length and height of the sipe, such that the opposing sides of the tread are arranged in a mating configuration.

4. A method for forming a tire tread, the tread having: a length extending in a lengthwise direction, the lengthwise direction being a circumferential direction when the tread is arranged on a tire; a width extending in a lateral direction, the lateral direction being perpendicular to the lengthwise direction; a thickness extending in a depthwise direction from an outer, ground-engaging side of the tread, the depthwise direction being perpendicular to both the lengthwise direction and the widthwise direction of the tread, the method comprising the steps of:

molding each of a plurality of sipes using a sipe-molding member, each sipe-molding member having a length configured within the tread to extend at least partially in a direction of the tread length or width, a height configured within the tread to extend at least partially in a direction of the tread depth and perpendicular to the tread length, and a thickness, each sipe-molding member arranged between opposing sides of the tread within the tread thickness, where at least one of the opposing sides of the sipe-molding member thickness includes a plurality of recesses for forming a plurality of projections in at least one of the opposing sides of the tread, the plurality of recesses being spaced apart and each having a height measuring 0.025 to 0.375 millimeters;

removing the sipe-molding member, leaving a sipe remaining within the tread, the sipe having a void shaped as the sipe-molding member and a plurality of projections corresponding to the plurality of recesses arranged along the sipe-molding member, where one or more of the opposing sides of the sipe thickness include a plurality of recesses, the plurality of recesses being spaced apart and each having a depth measuring 0.025 to 0.375 millimeters, where the plurality of projections are arranged in an alternating arrangement within a plurality of rows, where adjacent rows are shifted relative each other such that each projection in any row is arranged adjacent to one of the plurality of recesses in each adjacent row, and where the projections and recesses are formed along the thickness of the sipe-molding member undulating back and forth along a non-linear, undulating path as the sipe-molding member extends in the direction of the sipe height or length, the non-linear, undulating path forming a plurality of undulations and having a period of 0.1 to 3.0 millimeters and an amplitude of 0.025 to 0.375 millimeters, where the sipe thickness undulates back and forth along a first path as the sipe extends in a direction of the sipe height or length, the first path forming a plurality of undulations and having a period greater than the spacing between the plurality of projections and an amplitude greater than the amplitude of each of the plurality of projections, where the plurality of projections are arranged along one or more of the plurality undulations, and where the arrangement of projections and recesses is represented by a function of $f(x,y)=A*\sin(B*x)*\sin(C*y)$, where A, B, and C are scaling factors.

5. The method of claim 4, where the other of the opposing sides of the sipe-molding member thickness includes a plurality of projections, the plurality of projections being spaced apart and each having a height measuring 0.025 to 0.375 millimeters.

6. The method of claim 4, where for each of the plurality of sipes, the plurality of projections and the plurality of recesses are arranged in an alternating projection-recess arrangement along the length and height of the sipe-molding member, such that the opposing sides of the tread are arranged in a mating configuration.

7. The method recited in claim 4, where each of the plurality of sipe-molding members include a thick sipe-molding portion surrounding at least a portion of a thin sipe-molding portion.

* * * * *